(12) United States Patent
Arambepola et al.

(10) Patent No.: US 10,848,267 B2
(45) Date of Patent: **\*Nov. 24, 2020**

(54) CONFIGURABLE CONSTELLATION MAPPING TO CONTROL SPECTRAL EFFICIENCY VERSUS SIGNAL-TO-NOISE RATIO

(71) Applicant: Intel Corporation, Santa Clara, CA (US)

(72) Inventors: Bernard Arambepola, Enfield (GB); Noam Tal, Givataim (IL); Sahan S. Gamage, Cambridge (GB); Thushara Hewavithana, Hatfield (GB); Shaul Shulman, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/177,219

(22) Filed: Oct. 31, 2018

(65) Prior Publication Data
US 2019/0173609 A1 Jun. 6, 2019

Related U.S. Application Data

(63) Continuation of application No. 15/790,807, filed on Oct. 23, 2017, now Pat. No. 10,158,451, which is a (Continued)

(51) Int. Cl.
| | | |
|---|---|---|
| *H04W 4/00* | (2018.01) | |
| *H04L 1/00* | (2006.01) | |
| *H04L 5/00* | (2006.01) | |
| *H04L 27/00* | (2006.01) | |
| *H04L 27/26* | (2006.01) | |

(52) U.S. Cl.
CPC .......... *H04L 1/004* (2013.01); *H04L 1/0041* (2013.01); *H04L 5/0046* (2013.01); *H04L 27/0008* (2013.01); *H04L 27/2634* (2013.01)

(58) Field of Classification Search
CPC ...... H04W 72/04; H04W 88/08; H04W 76/00
See application file for complete search history.

(56) References Cited

U.S. PATENT DOCUMENTS

| | | |
|---|---|---|
| 6,625,219 B1 | 9/2003 | Stopler |
| 7,386,072 B2 | 6/2008 | Uno |

(Continued)

*Primary Examiner* — Siren Wei
(74) *Attorney, Agent, or Firm* — Alliance IP, LLC

(57) ABSTRACT

Mixed mode constellation mapping to map a data block to a block of sub-carriers based on a configurable set of one or more constellation mapping schemes, and corresponding mixed mode least likelihood ratio (LLR) de-mapping based on the configurable set of one or more modulation schemes. The set may be configurable to include multiple modulation schemes to provide to a SEvSNR measure that is a non-weighted or weighted average of SEvSNR measures of the multiple modulation schemes. Mixed mode constellation mapping may be useful be configurable to control spectral efficiency versus SNR (SEvSNR) over a range of SNR with relatively fine SNR granularity, and may be configurable to control SEvSNR over a range of SNR at a fixed FEC code rate, which may include a highest available or highest permitted code rate.

20 Claims, 8 Drawing Sheets

Related U.S. Application Data continuation of application No. 15/479,878, filed on Apr. 5, 2017, now Pat. No. 10,341,046, which is a continuation of application No. 14/197,208, filed on Mar. 4, 2014, now Pat. No. 9,634,795.

(60) Provisional application No. 61/772,184, filed on Mar. 4, 2013.

(56) References Cited

U.S. PATENT DOCUMENTS

| | | | |
|---|---|---|---|
| 8,826,108 | B1 | 9/2014 | Zhang et al. |
| 9,634,795 | B2 | 4/2017 | Arambepola et al. |
| 2002/0051501 | A1* | 5/2002 | Demjanenko ....... H04L 27/3416 375/298 |
| 2003/0165189 | A1 | 9/2003 | Kadous |
| 2005/0201446 | A1* | 9/2005 | Bar-Ness ............. H04B 1/7176 375/130 |
| 2008/0107193 | A1 | 5/2008 | Erceg et al. |
| 2008/0170533 | A1* | 7/2008 | Cyzs ........................ H04B 7/04 370/315 |
| 2009/0161784 | A1 | 6/2009 | Stadelmeier et al. |
| 2009/0310526 | A1* | 12/2009 | Gore ................. H04W 56/0045 370/312 |
| 2010/0034219 | A1* | 2/2010 | Stadelmeier ....... H04N 21/4385 370/478 |
| 2010/0054353 | A1 | 3/2010 | Roh et al. |
| 2010/0074350 | A1 | 3/2010 | Malladi et al. |
| 2010/0154017 | A1 | 6/2010 | An et al. |
| 2011/0280238 | A1* | 11/2011 | Kreuzer ............. H04L 27/0008 370/347 |
| 2013/0004179 | A1 | 1/2013 | Nielsen et al. |
| 2013/0126713 | A1 | 5/2013 | Haas et al. |
| 2014/0133330 | A1* | 5/2014 | Chapman ............. H04L 69/323 370/252 |
| 2014/0211833 | A1* | 7/2014 | Schoeneich ........ H04L 25/0232 375/219 |

\* cited by examiner

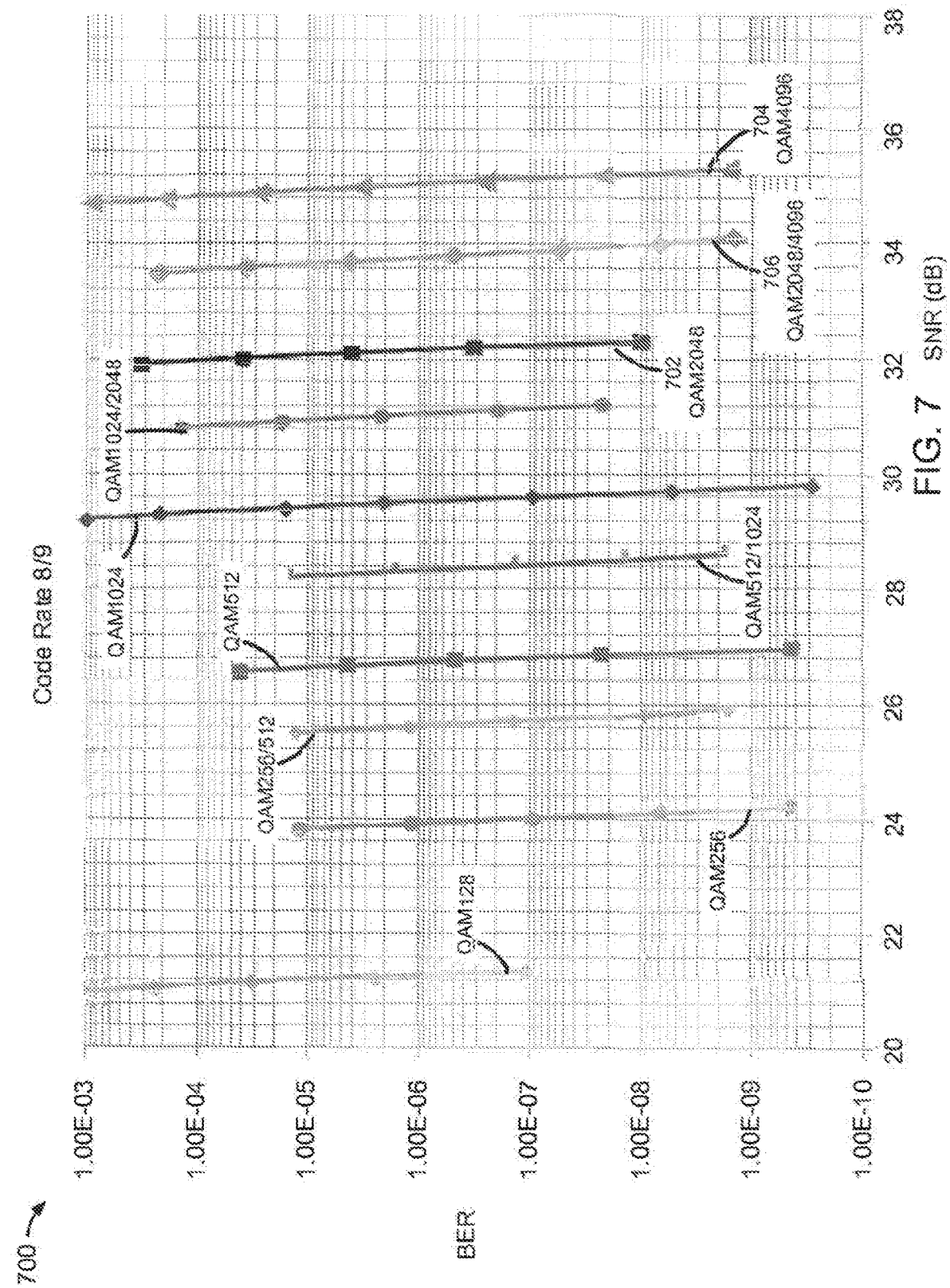

CONFIGURABLE CONSTELLATION MAPPING TO CONTROL SPECTRAL EFFICIENCY VERSUS SIGNAL-TO-NOISE RATIO

CROSS REFERENCE TO RELATED APPLICATIONS

This application is a continuation of U.S. application Ser. No. 15/790,807, filed Oct. 23, 2017, which is a continuation of U.S. application Ser. No. 15/479,878, filed Apr. 5, 2017, which is a continuation of U.S. application Ser. No. 14/197,208, filed Mar. 4, 2014, which claims the benefit of U.S. Provisional Application No. 61/772,184, filed Mar. 4, 2013. The disclosure of each prior application is considered part of (and is incorporated by reference in) the disclosure of this application.

TECHNICAL FIELD

Constellation mapping, modulation, least likelihood ratio (LLR) de-mapping, forward error correction (FEC), and spectral efficiency versus signal-to-noise ratio (SNR).

BACKGROUND

Spectral efficiency refers to an information rate (i.e., excluding error correction code), that may be transmitted over a given bandwidth or communication channel. Spectral efficiency is a measure of how efficiently a limited frequency spectrum is utilized by a physical layer protocol (and/or by a media access control or channel access protocol). Spectral efficiency may also be referred to as spectrum efficiency and/or bandwidth efficiency.

Modulation efficiency is measure of a gross bitrate (i.e., including error correction code) of a transmitted signal (e.g., in bits/second), divided by the bandwidth of the signal.

Forward error correction (FEC) may reduce a bit-error rate of a transmitted signal to permit operation at a lower signal-to-noise ratio (SNR). FEC encoding may also reduce spectral efficiency relative to an un-coded modulation efficiency. For example, a FEC code rate 1/2 reduces spectral efficiency to ½ the modulation efficiency.

An upper bound of attainable modulation efficiency is defined by the Nyquist rate or Hartley's law. An upper bound for spectral efficiency without bit errors in a channel at a given SNR is defined by the Shannon or Shannon-Hartley theorem.

Conventional standards for cable modems specify multiple FEC block sizes, FEC code rates, and quadrature amplitude modulation (QAM) constellations. For a given FEC block size and code rate, each QAM constellation provides an acceptable BER above a SNR threshold.

Conventionally, spectral efficiency versus SNR (SEvSNR) is controllable through selectable FEC code rates. Supporting multiple code rates increases system complexity. In addition, lower code rates reduce efficiency in terms of low-density parity-check (LDPC) encoder/decoder iterations.

SUMMARY

Disclosed herein configurable constellation mapping techniques, referred to herein as mixed mode constellation mapping, to map a data block to a block of sub-carriers based on a configurable set of one or more selectable constellation mapping schemes. The terms constellation mapping scheme and modulation scheme are used interchangeably herein.

Also disclosed herein corresponding configurable LLR de-mapping techniques, referred to herein as mixed mode LLR de-mapping.

Mixed mode constellation mapping may be configurable to control spectral efficiency versus SNR (SEvSNR) over a range of SNR, and may be configured to control SEvSNR with relatively fine SNR granularity.

Mixed mode constellation mapping may be configurable to control SEvSNR at a fixed FEC code rate, which may reduce system complexity.

Mixed mode constellation mapping may be configurable to control SEvSNR at a highest available FEC code rate, which may improve LDPC iteration efficiency relative to a system that controls SEvSNR with changes to a FEC code rate.

BRIEF DESCRIPTION OF THE DRAWINGS

FIG. 7 is a chart of bit error rate (BER) versus signal-to-noise ratio (SNR) for non-square and mixed modulation schemes based on simulations.

Figure 1:
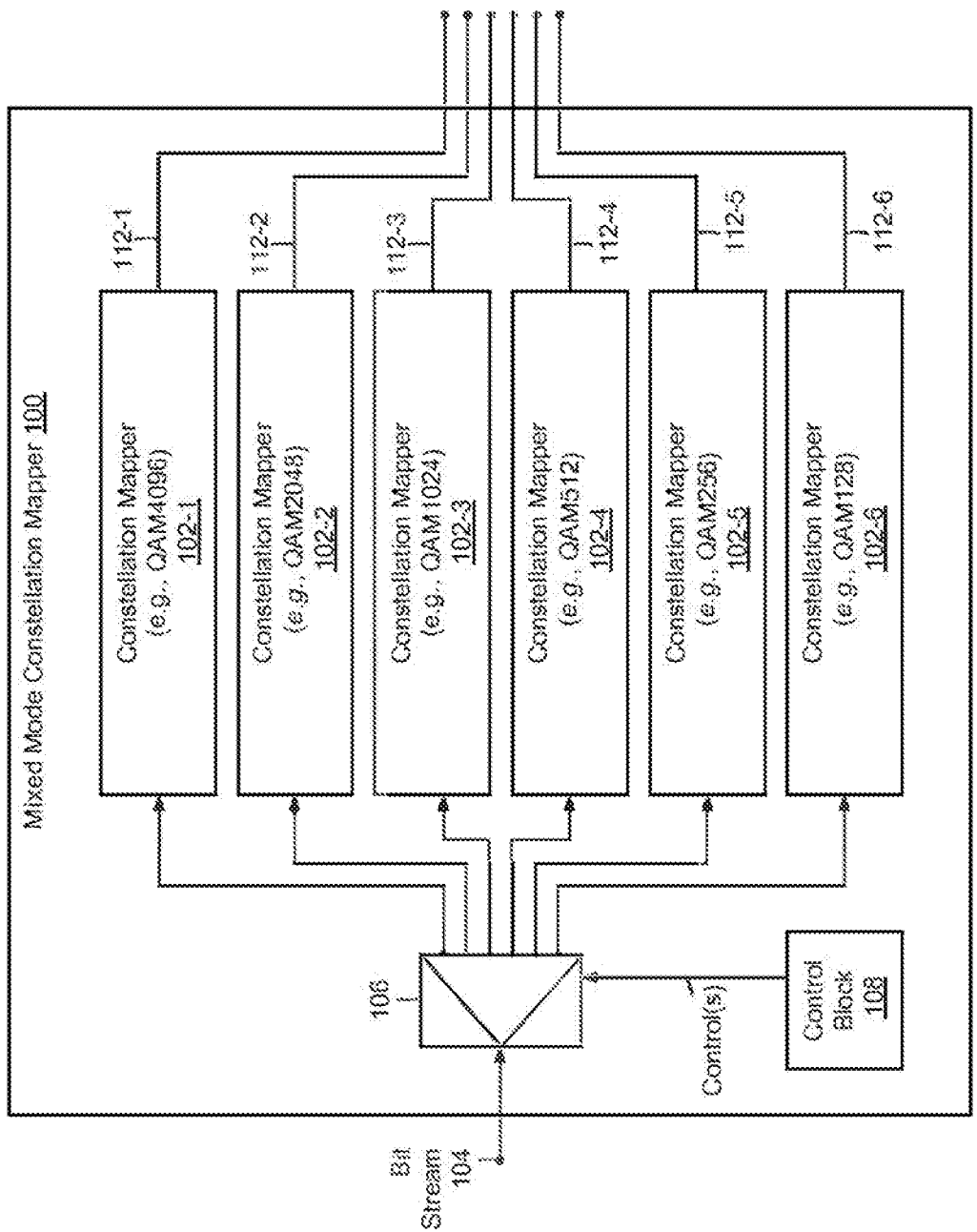
FIG. 1 is a block diagram of a mixed modulation constellation mapper constellation mapper to map a data block to a block of sub-carriers based on a configurable set of one or more constellation mapping schemes.

In the drawings, the leftmost digit(s) of a reference number identifies the drawing in which the reference number first appears.

DETAILED DESCRIPTION

FIG. 1 is a block diagram of a mixed modulation constellation mapper constellation mapper 100 to map a data block to a block of sub-carriers based on a configurable set of one or more constellation mapping schemes.

Mixed mode constellation mapper 100 includes multiple constellation mappers 102, each to map segments of a bit stream 104 based on a respective one of multiple modulation schemes.

For illustrative purposes, constellation mappers 102 are illustrated here as quadrature amplitude modulation (QAM) constellation mappers, each to map segments of bit stream based on a respective one of multiple QAM constellations. Mixed mode constellation mapper 100 is not, however, limited to QAM constellation mappers.

Constellation mappers 102 may be configured to map segments of bit stream 104 as symbols of respective sub-carriers 112.

Constellation mappers 102 may each be configured to map a sequence of segments of bit stream 104 into a base-band modulated sequence of complex symbols (e.g., phase and amplitude data), to provide sub-carriers 112 as frequency domain sub-carriers.

Constellation mappers 102 may be configured to map segments of bit stream 104 in parallel with one another.

One or more of constellation mappers 102 may represent multiple similarly configured constellation mappers.

One or more constellation mappers 102 may be configured to map to non-square QAM constellations. This may improve SNR resolution (i.e., reduce step-size) along an SNR axis of a spectral efficiency versus SNR (SEvSNR) graph.

Constellation mapper 100 further includes an inverse multiplexer 106 to apportion segments of bit stream 104 amongst selectable ones of constellation mappers 102. Inverse multiplexer 106 may be controllable and/or programmable to provide segments of bit stream 104 to selectable ones of constellation mappers 102.

Example selectable configurations mixed mode constellation mapper 100 are provided in Table 1 below.

TABLE 1

| Configuration Reference | Constellation Mapper(s) | Constellation Mapping/ Modulation Scheme(s) |
|---|---|---|
| CR1 | 102-1 | QAM4096 |
| CR2 | 102-1, 102-2 | QAM4096, QAM2048 |
| CR3 | 102-2 | QAM2048 |
| CR4 | 102-2, 102-3 | QAM2048, QAM1024 |
| CR5 | 102-3 | QAM1024 |
| CR6 | 102-3, 102-4 | QAM1024, QAM512 |
| CR7 | 102-4 | QAM512 |
| CR8 | 102-4, 102-5 | QAM512, QAM256 |
| CR9 | 102-5 | QAM256 |
| CR10 | 102-5, 102-6 | QAM256, QAM128 |
| CR11 | 102-6 | QAM128 |

Methods and systems disclosed herein are not limited to the example configurations of Table 1.

For example, mixed mode constellation mapper 100 may be configurable to map segments of bit stream 104 to a block of sub-carriers with a mix or combination of more than two modulation schemes.

As another example, mixed mode constellation mapper 100 may include one or more other selectable combinations of modulation schemes (e.g., a combination of constellation mappers 102-1 and 102-6 to map segments of bit stream 104 over a mix of QAM4096 sub-carriers and QAM128 sub-carriers).

As another example, a selectable set of multiple modulation schemes may be configured to map to approximately equal numbers of sub-carriers of each of multiple modulation schemes (i.e., a mix of 50% QAM4096 sub-carriers and 50% QAM2048 sub-carriers), or unequal numbers (e.g., a mix of 25% QAM4096 carriers and 75% QAM2048 sub-carriers). Inverse multiplexer 106 may be controllable and/or programmable to adjust a ratio of sub-carriers of multiple modulation schemes.

Inverse multiplexer 106 may be further controllable and/or programmable to segment bit stream 104 in bit-lengths that are based on modulation schemes of respective constellation mappers 102. For example, a 2048-point QAM constellation (QAM2048) has $2048=2^{11}$ constellation points, each associated with a respective 11-bit codeword. Inverse multiplexer 106 may be configured to apportion 11-bit segments to QAM2048 constellation mapper 102-2 in FIG. 1.

Constellation mapper 100 further includes a control block 108 to configure and/or program inverse multiplexer 106 to provide segments of bit stream 104 to selectable ones of constellation mappers 102. Control block 108 may be further configured to control inverse multiplexer 106 to segment bit stream 104 based on a selected set of one or more constellation mappers 102. Control block 108 may be further configured to control inverse multiplexer 106 to adjust a ratio of sub-carriers of multiple modulation schemes.

Sub-carriers 112 may be provided to a modulator to modulate a carrier, such as described below with reference to FIG. 2.

Mixed mode constellation mapper 100 may be configurable to control SEvSNR of the modulated carrier with relatively fine SNR granularity. In Table 1, for example, configuration CR2 (a mix of QAM4096 and QAM2048), may be selected to provide a SEvSNR measure that is between SEvSNR measures of QAM4096 and QAM2048. A proportion of QAM4096 sub-carriers to QAM2048 sub-carriers may be configured to provide configuration CR2 with a SEvSNR measure that is a non-weighted or a weighted average the SEvSNR measures of QAM4096 and QAM2048.

Mixed mode constellation mapper 100 may be useful control a SEvSNR of the modulated carrier within relatively fine SNR granularity, while maintaining a fixed FEC code rate and/or a highest available FEC code rate, such as described below with reference to FIG. 2.

Figure 2:
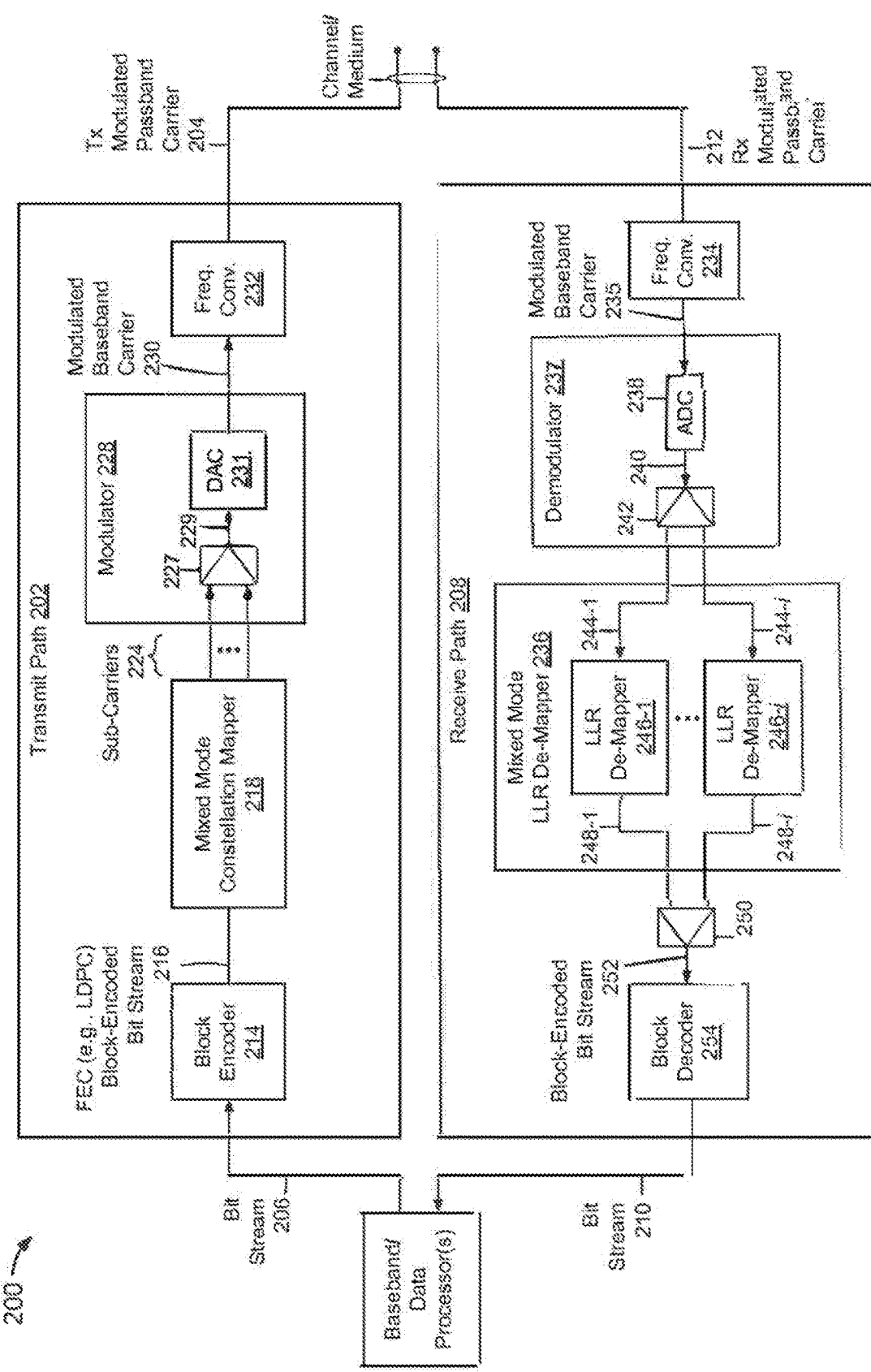
FIG. 2 is a block diagram of a transceiver that includes a mixed mode constellation mapper within a transmit path, and a mixed mode least likelihood ratio (LLR) de-mapper within a receive path.

FIG. 2 is a block diagram of a transceiver 200 that includes a mixed mode constellation mapper 218 within a transmit path 202. Mixed mode constellation mapper 218 may be configured as described above with respect to FIG. 1. Mixed mode constellation mapper 218 is not, however, limited to the example of FIG. 1.

Transceiver 200 further includes a mixed mode least likelihood ratio (LLR) de-mapper 236 within a receive path 108, which is described further below.

Transceiver 200 may be referred to herein as a modulator/demodulator or modem 200, and may be configured as a cable modem. Transceiver 200 is not, however, limited cable modems.

Transmit path 202 further includes a block encoder 214 to block-encode a bit stream 206, to provide a block-encoded bit stream 216. Block encoder 214 may include, without limitation, a forward error correction (FEC) block encoder, such as described below with reference to FIG. 3. In FIG. 2, block-encoded bit stream 216 is illustrated as an FEC (e.g., LDPC) block-encoded bit stream. Block encoder 214 is not, however, limited to an FEC block encoder, an LDPC FEC block encoder, or to the examples of FIG. 3.

Figure 3:
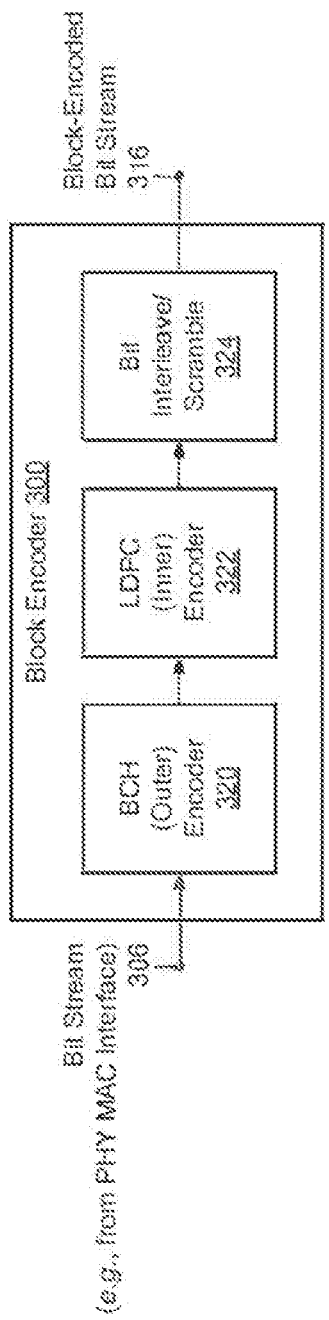
FIG. 3 is a block diagram of a block encoder that includes a BCH outer encoder and a low-density parity-check (LDPC) inner encoder.

FIG. 3 is a block diagram of a block encoder 300 to block-encode a bit stream 306 to provide a block-encoded bit stream 316. Block encoder 300 includes a BCH encoder 320 and a low-density parity-check (LDPC) encoder 322. The acronym BCH is based on names of mathematicians Alexis Hocquenghem, Raj Bose, and D. K. Ray-Chaudhuri.

LDPC encoder 322 may be configured as an inner error correction encoder and BCH encoder 320 may be configured as outer error correction encoder.

Block encoder 300 further includes a bit interleave or scramble block 324, such as to perform (e.g., parity interleaving and/or column-twist interleaving).

In FIG. 2, mixed mode constellation mapper 218 is configurable to map segments of block-encoded bit stream 216 to a block of sub-carriers 224 based on a set of one of more selectable modulation schemes, such as described above with respect to FIG. 1.

Mixed mode constellation mapper 218 may be configured to map a single FEC-encoded data block over a block of sub-carriers 224, multiple FEC-encoded data blocks over a block of sub-carriers 224, and/or a portion of an FEC-encoded data block over a block of sub-carriers 224.

As described above with respect to FIG. 1 and Table 1, mixed mode constellation mapper 218 may be configured to control SEvSNR of a modulated passband carrier 204 over a range of SNR with relatively fine SNR granularity.

Mixed mode constellation mapper 218 may be configured to control SEvSNR of modulated passband carrier 204 over a range of SNR with relatively fine SNR granularity while maintaining a fixed FEC code rate and/or while using a highest available or highest permissible FEC code rate. A highest permissible FEC code rate may be defined by a standard.

In FIG. 3, for example, LDPC encoder 322 may be configured to encode block lengths of 16,200 bits with a selectable code rate 4/9, 6/3, 11/15, 7/9, or 37/45, or 8/9. In this example, LDPC encoder 322 may be set to use the highest available code rate 8/9, and SEvSNR may be controlled with mixed mode constellation mapper 218 in FIG. 2. Further in this example, BCH encoder 320 may be configured to encode blocks using an outer 12-bit error correcting BCH code with 168 parity bits. LDPC encoder 322 and BCH encoder 320 are not, however, limited to these examples.

In FIG. 2, transmit path 202 further includes a modulator 228 to modulate a baseband carrier 230 with sub-carriers 224. Modulator 228 may be configured to perform orthogonal frequency division multiplexing (OFDM), orthogonal frequency division multiple access (OFDMA), and/or single-carrier frequency division multiple access (SC-FDMA). In a SC-FDMA configuration, modulator 228 may be configured to receive modulated sub-carriers from one or more other constellation mappers to combine with sub-carriers 224. Modulator 228 is not, however, limited to these examples.

Modulator 228 may include an Inverse Fast Fourier Transform (IFFT) module 227 to convert frequency domain sub-carriers 124 to time domain samples 129. In a SC-FDMA configuration, modulator 228 may include one or more additional IFFT modules to convert frequency domain sub-carriers from one or more other constellation mappers to time domain samples.

IFFT module 227 may be configured to compute an IFFT for each of FEC encoded block of bit stream 116. In this example, unused inputs to IFFT module 227 may be zero-padded. In another embodiment, modulator 228 is configured to collect sub-carriers 224 until there are sufficient sub-carriers 224 for all inputs of IFFT module 227. Each IFFT computation may represent a symbol of modulated baseband carrier 230.

Modulator 228 further includes a digital-to-analog converter (DAC) 231 to convert time domain samples 229 to provide modulated baseband carrier 130 as an analog signal.

Transmit path 202 further includes a frequency converter 232 to convert carrier 130 from baseband to a pass-band (e.g., to a radio frequency or RF), modulated carrier 204.

Transmit path 202 may include one or more additional blocks to perform one or more additional operations or functions such as, without limitation, pilot insertion, interleaving, cyclic prefix insertion, and/or windowing, such as described below with reference to FIG. 4. Transmit path 202 is not, however, limited to the example of FIG. 4.

Figure 4:
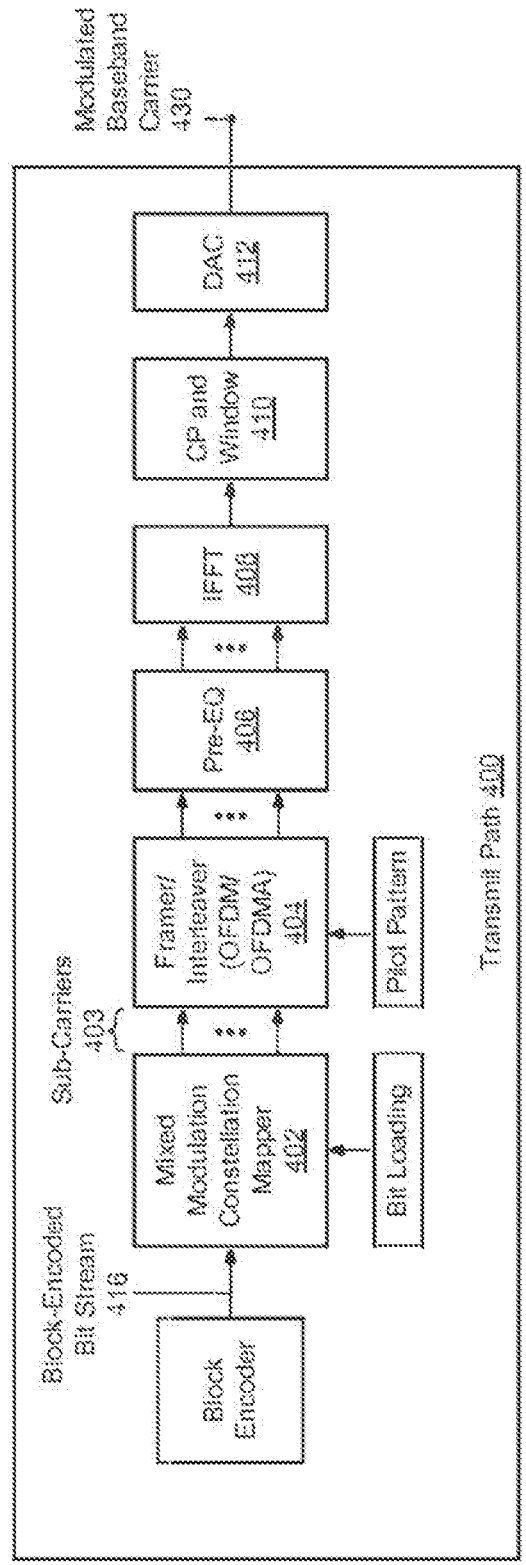
FIG. 4 is a block diagram of a transmit path that includes a mixed mode constellation mapper to modulate segments of a block-encoded bit stream to a block of sub-carriers based on a configurable set of one of more selectable modulation schemes.

FIG. 4 is a block diagram of a transmit path 400 that includes a mixed mode constellation mapper 402 to modulate segments of a block-encoded bit stream 416 to a block of sub-carriers 403 based on a configurable set of one of more modulation schemes, such as described above with respect to FIG. 1.

Transmit path 400 further includes a framer/interleaver 404 to add pilots to sub-carriers 403 and to interleave the sub-carriers in time and/or frequency. Framer/interleaver 404 may be configured, without limitation, as an OFDM framer/interleaver or an orthogonal frequency division multiple access (OFDMA) framer/interleaver.

Transmit path 400 further includes a pre-equalizer 406 to pre-distort the constellation symbols to compensate for a channel response associated with a transmission channel.

Transmit path 400 further includes an IFFT module 408 to transform each pre-equalized symbol from pre-equalizer 406 into the time domain, and to convert IFFT results from parallel to serial.

Transmit path 400 may be configured to zero-pad unused inputs to IFFT module 408. Alternatively, modulator 400 may be configured to collect outputs of pre-equalizer 406 until there are sub-carriers for all inputs to IFFT module 408.

Transmit path 400 further includes a cyclic prefix (CP) and windowing block 410 to prepend a cyclic prefix and to perform a windowing operation.

Transmit path 400 further includes a DAC 412, such as described above with respect to DAC 231 in FIG. 2.

Figure 5:
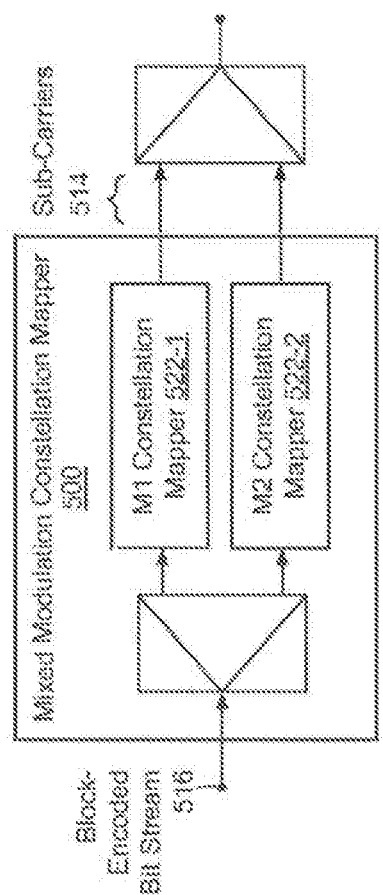
FIG. 5 is a block diagram of a mixed mode constellation mapper to map segments of a block-encoded bit stream to a block of sub-carriers based on a mix of first and second modulation schemes M1 and M2.

FIG. 5 is a block diagram of a mixed mode constellation mapper 500 to map segments of a block-encoded bit stream 516 to a block of sub-carriers 524 based on a mix of first and second modulation schemes M1 and M2.

Mixed modulation constellation mapper 500 includes first and second constellation mappers 522-1 and 522-2. First constellation mapper 522-1 is configured to map based on a first modulation scheme, denoted here as M1. Second constellation mapper 522-2 is configured to map based on a second modulation scheme, denoted here as M2. First constellation mapper 522-1 and/or second constellation mapper 522-2 may represent multiple similarly configured constellation mappers.

In an embodiment, mixed mode constellation mapper 500 is configured apportion segments S of block encoded bit stream 516 amongst constellation mappers 522-1 and 522-2 to modulate equal or nearly numbers of M1 and M2 sub-carriers. This may be useful to provide a SEvSNR measure that is a non-weighted average of SEvSNR measures of modulation schemes M1 and M1.

In another embodiment, mixed mode constellation mapper 500 is configured apportion segments S of block encoded bit stream 516 amongst first and second constellation mappers 522-1 and 522-2 to modulate unequal numbers of M1 and M2 sub-carriers. This may be useful to provide a SEvSNR measure that is a weighted average of SEvSNR measures of modulation schemes M1 and M1.

Figure 6:
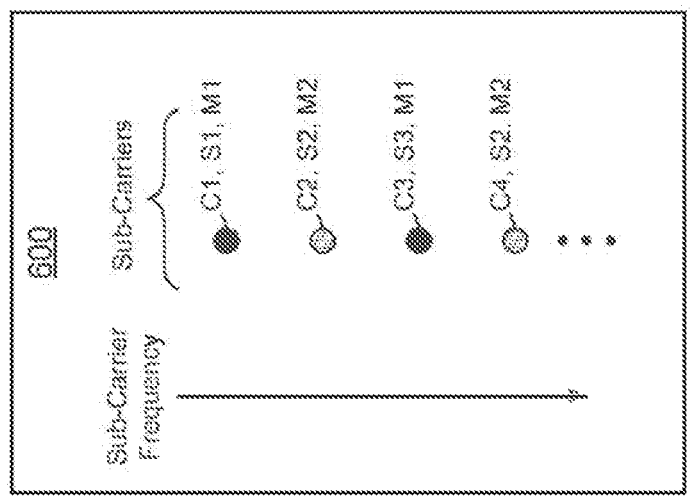
FIG. 6 is a depiction in which sub-carriers C are modulated with segments S based on alternating modulation schemes M1 and M2.

An example is provided in Table 2 below in which segments S are apportioned amongst first and second constellation mappers 422-1 and 422-2 in an alternating fashion to modulate equal or nearly numbers of M1 and M2 sub-carriers. FIG. 6 is a corresponding depiction 600 in which sub-carriers C are modulated with segments S based on alternating modulation schemes M1 and M2. One or more other configurations may be employed to modulate a block across equal or nearly equal numbers of M1 and M2 sub-carriers.

TABLE 2

| Segment | Constellation Mapper | Sub-Carrier | Modulation Scheme |
|---------|---------------------|-------------|-------------------|
| S1 | 522-1 | C1 | M1 |
| S2 | 522-2 | C2 | M2 |
| S3 | 522-1 | C3 | M1 |
| S4 | 522-2 | C4 | M2 |
| ⋮ | ⋮ | ⋮ | ⋮ |

Receive path 208 of FIG. 2 is now described.

Receive path 208 includes a frequency converter 234 to convert pass-band modulated carrier 212 to baseband, illustrated here as a modulated baseband carrier 235.

Receive path 208 further includes a demodulator 237 to demodulate sub-carriers 244 of modulated baseband carrier 235. In FIG. 2, demodulator 237 includes an analog-to-digital converter (ADC) 238 to provide time domain samples 240 of baseband carrier 235. Demodulator 237 further includes a Fast Fourier Transform (FFT) module 242 to convert time domain samples 240 to frequency domain sub-carriers 244. In a SC-FDMA configuration, demodulator 237 may include one or more additional FFT modules.

Mixed mode LLR de-mapper 236 is configured to compute LLRs 248 for a block of demodulated sub-carriers 244 based a set of one or more modulation schemes. Mixed mode LLR de-mapper may be configurable with respect to the set of one or more modulation schemes, and may be configured based on a configuration of mixed mode constellation mapper 218.

Mixed mode LLR de-mapper 236 is configured to compute an LLR for each bit of each codeword of each sub-carrier within the block of demodulated sub-carrier 244. In FIG. 2, mixed mode LLR de-mapper 236 includes LLR de-mappers 246-1 through 246-i, each to compute respective LLRs 248 based on a respective one of multiple modulation schemes. For example, if LLR de-mapper 246-1 is configured based on QAM2048, it will compute a set of LRRs 248-1 to include 11 LLRs for codeword or symbol of a sub-carrier assigned to de-mapper 246-1.

Each LLR de-mapper 246 may be configured to processes one sub-carrier of a symbol at a time.

Each LLR de-mapper 246 may include a corresponding LLR de-interleaver to operate on respective LLRs.

Receive path 208 further includes a block decoder 254 to decode bit stream 210 based on LLRs 248. Block decoder 254 may be configured based on a configuration of block encoder 214. Block decoder 254 may include, without limitation, a FEC block decoder, which may include a BCH outer decoder, a LDPC inner decoder, and/or a bit de-interleaver, and which may be configured to in a reverse order relative to block encoder 214.

Simulations have been performed to determine bit error rates for non-square and 50% mixed modulation schemes based on LDPC FEC blocks of 16,200 bits, code rate 8/9, and an outer 12-bit-error correcting BCH code with 168 parity bits. Results of the simulations are described below with reference to FIGS. 7 and 8. Methods and systems disclosed herein are not, however, limited to the simulations.

For QAM4096 OFDM sub-carrier modulation, spectral efficiency of the FEC is 10.54 bits/s/Hz. The AWGN SNR needed to achieve a BER of 1e-8 is 35.2 dB. For QAM2048 OFDM sub-carrier modulation, spectral efficiency of the FEC is 9.67 bits/s/Hz, and the AWGN SNR needed to achieve a BER of 1e-8 is 32.3 dB.

FIG. 7 is a chart of bit error rate (BER) versus SNR for non-square and 50% mixed modulation schemes based on simulations under the conditions specified above.

QAM2048 is represented in a graph 702.

QAM4096 is represented in a graph 704.

A 50% mix of QAM2048 and QAM4096 is represented in a graph 706. This has a spectral efficiency of 10.1 bis/s/Hz, which is halfway between QAM2048 and QAM4096, and the AWGN SNR needed to achieve a BER of 1e-8 is about 33.9 which is approximately halfway between the SNRs required for QAM4096 and QAM2048.

Figure 8:
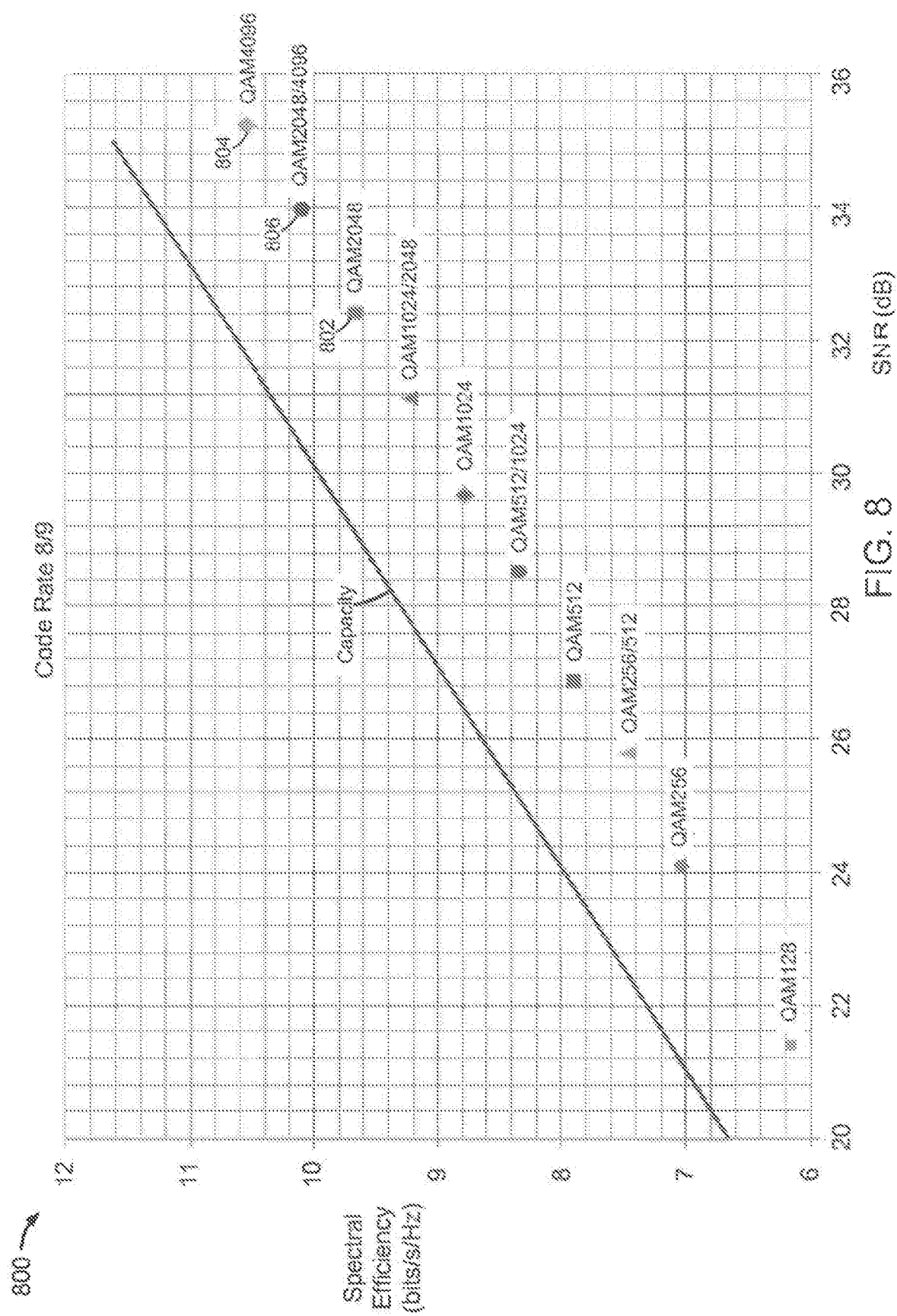
FIG. 8 is a spectral efficiency plot for the modulation schemes of FIG. 7, based on an SNR requirement measured at BER 1e-8 in FIG. 7.

FIG. 8 is a spectral efficiency plot 800 for the modulation schemes of FIG. 7, based on an SNR requirement measured at BER 1e-8 in FIG. 7. Plot 800 is based on the simulations under the conditions specified above.

In FIG. 8, performance points of the modulation schemes line up in a substantially linear line about 3 dB from Shannon channel capacity.

Performance point 802 corresponds to QAM2048.

Performance point 804 corresponds to QAM4096.

Performance point 806 corresponds to a 50% mix of QAM2048 and QAM4096.

The simulations show that modulation of encoded blocks over equal numbers of QAQ2048 and QAM4096 sub-carriers under the conditions specified above provides an OFDM carrier with a spectral efficiency of 10.10 bits/s/Hz, which is an average of the spectral efficiencies of QAM2048 (i.e., 10.54 bits/s/Hz) and QAM4096 (i.e., 9.67 bits/s/Hz).

Spectral efficiency plot 800 shows that multiple selectable modulation configurations provide relatively fine resolution along the SNR axis (approximately 1.5 dB SNR in the example of FIG. 8).

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof. Information processing by software may be concretely realized by using hardware resources.

Figure 9:
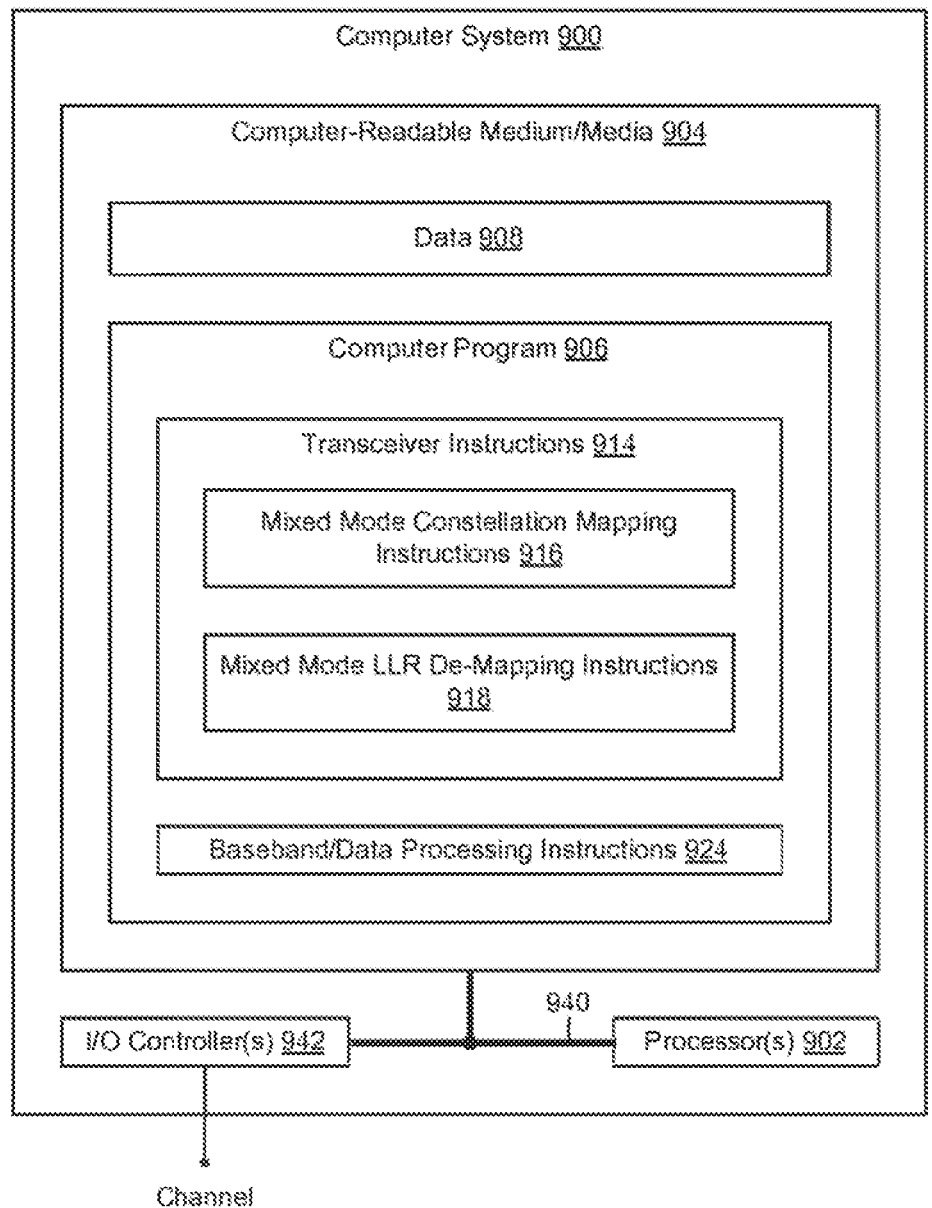
FIG. 9 is a block diagram of a computer system configured to map segments of a bit stream over a block of sub-carriers based on a configurable set of one or more selectable modulation schemes, and to de-map a block of sub-carriers based on the configurable set of one or more modulation schemes.

FIG. 9 is a block diagram of a computer system 900 configured to map segments of a bit stream over a block of sub-carriers based on a configurable set of one or more selectable modulation schemes, and to de-map a block of sub-carriers based on the configurable set of modulation scheme(s).

Computer system 900 includes one or more processors, illustrated here as a processor 902, to execute instructions of a computer program 906 encoded within a computer readable medium 904.

Processor 902 may include one or more instruction processors and/or processor cores, and may include a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

Processor 902 may further include a control unit to interface between the instruction processor(s)/core(s) and computer readable medium 904.

Computer readable medium 904 may include a transitory or non-transitory computer-readable medium, and may include, without limitation, registers, cache, and/or memory.

Computer-readable medium 904 may include data 908 to be used by processor 902 during execution of computer program 906 and/or generated by processor 902 during execution of computer program 906.

In the example of FIG. 9, computer program 906 includes transceiver instructions 914 to cause processor 902 to perform one or more transceiver functions, such as described in one or more examples herein.

Transceiver instructions 914 include mixed mode constellation mapping instructions 916 to cause processor 902 to perform one or more mixed mode constellation mapping functions, such as described in one or more examples herein.

Transceiver instructions 914 further include mixed mode LLR de-mapping instructions 918 to cause processor 902 to perform one or more mixed mode LLR de-mapping functions, such as described in one or more examples herein.

Computer program 906 may further includes baseband and/or data processing instructions 924 to cause processor 902 to perform one or more baseband signal processing functions and/or data processing functions.

Computer system 900 further includes communications infrastructure 940 to communicate amongst devices and/or resources of computer system 900.

Computer system 900 further includes one or more input/output (I/O) devices and/or controllers 942 to interface with one or more other systems, such as a communication channel or medium.

Methods and systems disclosed herein may be implemented with respect to one or more of a variety of systems, such as described below with reference to FIG. 10. Methods and systems disclosed herein are not, however, limited to the examples of FIG. 10.

Figure 10:
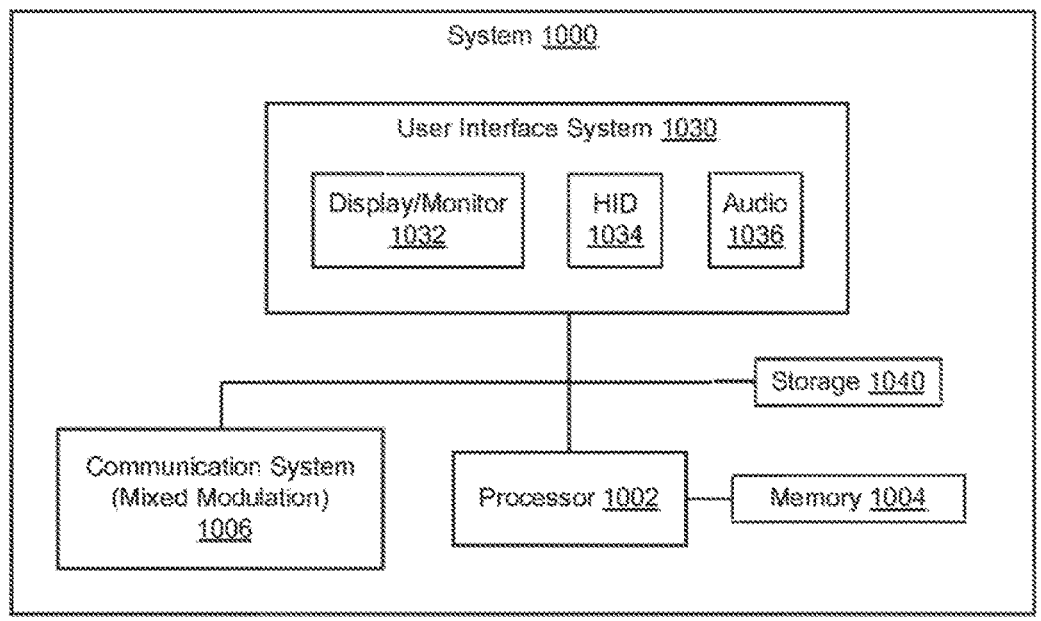
FIG. 10 is a block diagram of a system that includes a processor and memory, and a communication system that includes a mixed mode constellation mapper and a mixed mode LLR de-mapper.

FIG. 10 is a block diagram of a system 1000, including a processor 1002 and memory, cache, registers, and/or other computer-readable medium, collectively referred to herein as memory 1004. System 1000 further includes a communication system 1006 and a user interface system 1030. System 1000 may further include an electronic or computer-readable storage medium (storage) 1040, which may be accessible to processor 1002, communication system 1006, and/or user interface system 1030.

Communication system 1006 may include a mixed modulation constellation mapper and/or a mixed modulation LLR de-mapper, such as described in one or examples herein.

Communication system 1006 may be configured to communicate with an external communication network on behalf of processor 1002 and/or user interface system 1030. The external network may include a voice network (e.g., a wireless telephone network), and/or a data or packet-based network (e.g., a proprietary network and/or the Internet), such as a digital video broadcast (e.g., over cable) network.

Communication system 1006 may include a wired (e.g., cable) and/or wireless communication system, and may be configured in accordance with one or more digital video broadcast standards.

User interface system 1030 may include a monitor or display 1032 and/or a human interface device (HID) 1034. HID 1034 may include, without limitation, a key board, a cursor device, a touch-sensitive device, a motion and/or image sensor, a physical device and/or a virtual device, such as a monitor-displayed virtual keyboard. User interface system 1030 may include an audio system 1036, which may include a microphone and/or a speaker.

System 1000 and/or communication system 1006 may be configured as a stationary or portable/hand-held system, and may be configured as, for example, a mobile telephone, a set-top box, a gaming device, and/or a rack-mountable, desk-top, lap-top, notebook, net-book, note-pad, or tablet system, and/or other conventional and/or future-developed system(s). System 1000 is not, however, limited to these examples.

System 1000 or portions thereof may be implemented within one or more integrated circuit dies, and may be implemented as a system-on-a-chip (SoC).

Figure 11:
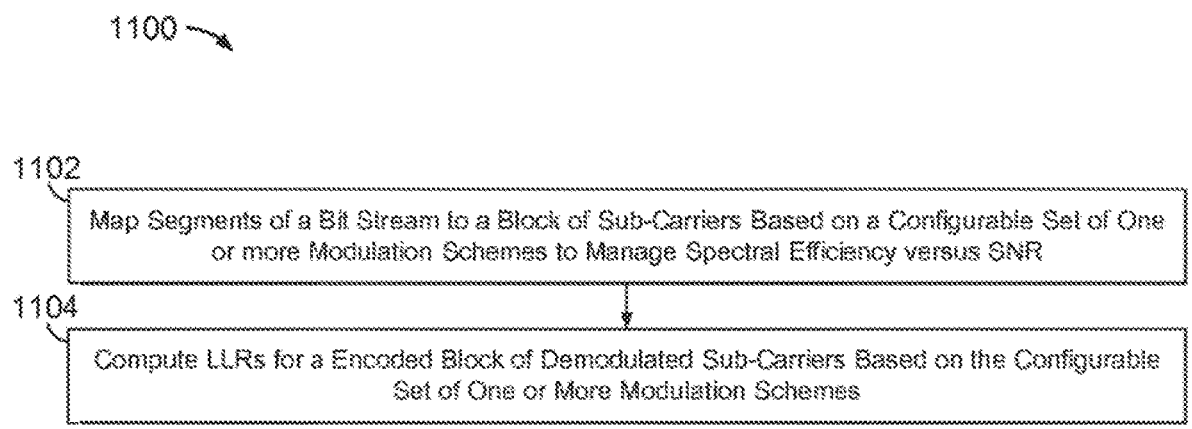
FIG. 11 is a flowchart of a method of mapping and de-mapping blocks of sub-carriers based on a configurable set of one or more modulation schemes.

FIG. 11 is a flowchart of a method 1100 of mapping and de-mapping blocks of sub-carriers based on a configurable set of one or more modulation schemes.

At 1102, a data block is mapped to a block of sub-carriers based on a configurable set of one or more modulation schemes to manage SEvSNR, such as described in one or more examples herein.

At 1104, LLRs are computed for a block of demodulated sub-carriers based on the configurable set of one or more modulation schemes, such as described in one or more examples herein.

Examples

The following examples pertain to further embodiments.

An Example 1 is a method that includes mapping a data block to a block of sub-carriers based on a set of one or more modulation schemes, and configuring the set of one or more modulation schemes to control spectral efficiency versus signal-to-noise ratio (SEvSNR) of over a range of SNR.

In an Example 2, the method further includes configuring the set to include multiple modulation schemes to provide a SEvSNR measure that is an average of SEvSNR measures of the multiple modulation schemes.

In an Example 3, the method further includes configuring the set to include multiple modulation schemes to provide a SEvSNR measure that is a non-weighted average of SEvSNR measures of the multiple modulation schemes.

In an Example 4, the method further includes configuring the set to include multiple modulation schemes to provide a SEvSNR measure that is a weighted average of SEvSNR measures of the multiple modulation schemes.

In an Example 5, the method further includes configuring a ratio of sub-carriers of the multiple modulation schemes to control the SEvSNR measure over a range SNR.

In an Example 6, the method further includes configuring the set include one of a first modulation scheme to provide a first SEvSNR measure, a second modulation scheme to provide a second SEvSNR measure, and a combination of the first and second modulation schemes to provide a third SEvSNR measure that is between the first and second SEvSNR measures.

In an Example 7, the method further includes configuring the set to include one or more of multiple quadrature amplitude modulation (QAM) schemes, each associated with a respective constellation map.

In an Example 8, the method further includes block-encoding a bit stream with a forward error correction (FEC) to provide a FEC-encoded data block, mapping the FEC-encoded data block to the block of sub-carriers, and manage the set to control SEvSNR over a range of SNR at a fixed FEC code rate.

In an Example 9, the method further includes FEC encoding at a highest one of multiple selectable code rates.

In an Example 10, the FEC encoding includes low-density parity-check (LDPC) inner encoding to block-encode with a code rate 8/9, and BCH outer encoding to block-encode with an outer 12-bit error correcting BCH code and 168 parity bits. Example 10 further includes configuring the set to include one or more of multiple non-square quadrature amplitude modulation (QAM) schemes.

In an Example 11, further to Example 10, the method further includes controlling the SEvSNR over a range of SNR in increments of 1.5 dB SNR.

An Example 12 is a one machine readable medium comprising a plurality of instructions that in response to being executed on a computing device, cause the computing device to carry out a method according to any one of claims 1-11.

An Example 13 is a communications device arranged to perform the method of any one of Examples 1-11.

An Example 14 is an apparatus to compute a device location, configured to perform the method of any one of the claims 1-11.

An Example 15 is a computer system to perform the method of any of claims 1-11.

An Example 16 is a machine to perform the method of any of claims 1-11.

An Example 17 is an apparatus comprising: means for performing the method of any one of claims 1-11.

An Example 18 is a computing device comprising a chipset according to any one of the claims 1-11.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A transceiver including:
    a constellation mapper to map data bit streams over a mix of selectable Quadrature Amplitude Modulation (QAM) constellations to yield constellation symbols of mixed-modulation data sub-carriers, wherein the data sub-carriers include Orthogonal Frequency Division Multiplexing (OFDM) sub-carriers;
    the transceiver to cause transmission of a Radio Frequency (RF) signal, the RF signal based on the constellation symbols, wherein the mix of selectable QAM constellations includes a pair of QAM constellations including 1024 QAM and 2048 QAM;
    an interleaver to interleave the constellation symbols in time and frequency;
    a Fourier Transform module to transform the constellation symbols from the interleaver into a time domain to generate time domain symbols; and
    a cyclic prefix (CP) and windowing block to prepend a cyclic prefix and to perform a windowing operation on the time domain symbols.

2. The transceiver of claim 1, further including a block encoder to block encode the data bit streams to generate block encoded data bit streams, the constellation mapper to map the block encoded data bit streams to yield the mixed-modulation data sub-carriers.

3. The transceiver of claim 2, wherein the block encoder includes Low-Density Parity Check (LDPC) Forward Error Correction (FEC) coding.

4. The transceiver of claim 3, wherein the block encoder is configured to encode data bit stream block lengths of 16,200 bits with an 8/9 code rate.

5. The transceiver of claim 1, wherein the QAM constellations include non-square QAM constellations.

6. The transceiver of claim 1, further including an inverse multiplexer to distribute the data bit streams into multiple segments, the constellation mapper to map the segments onto the mix of selectable QAM constellations.

7. The transceiver of claim 1, further including a processor, and a storage storing instructions, the storage coupled to the processor.

8. The transceiver of claim 7, further including a user interface system.

9. A product comprising one or more tangible computer-readable non-transitory storage media comprising computer-executable instructions operable to, when executed by at least one computer processor, cause the at least one computer processor to implement operations at a transceiver, the operations comprising:
    mapping data bit streams over a mix of selectable Quadrature Amplitude Modulation (QAM) constellations to yield constellation symbols of mixed-modulation data sub-carriers, wherein the data sub-carriers include Orthogonal Frequency Division Multiplexing (OFDM) sub-carriers;
    causing transmission of a Radio Frequency (RF) signal, the RF signal based on the constellation symbols, wherein the mix of selectable QAM constellations includes a pair of QAM constellations including 1024 QAM and 2048 QAM;
    interleaving the constellation symbols in time and frequency;
    after interleaving, transforming the constellation symbols into a time domain to generate time domain symbols; and
    prepending a cyclic prefix and performing a windowing operation on the time domain symbols.

10. The product of claim 9, further including block encoding the data bit streams to generate block encoded data bit streams, mapping including mapping the block encoded data bit streams to yield the mixed-modulation data sub-carriers.

11. The product of claim 10, wherein block encoding includes Low-Density Parity Check (LDPC) Forward Error Correction (FEC) coding.

12. The product of claim 11, wherein block encoding includes encoding data bit stream block lengths of 16,200 bits with an 8/9 code rate.

13. The product of claim 9, wherein the mix of selectable QAM constellations include non-square QAM constellations.

14. The product of claim 9, further including distributing the data bit streams into multiple segments, mapping data bit streams including mapping the segments onto the mix of selectable QAM constellations.

15. A method to be performed at a transceiver, the method including:
- mapping data bit streams over a mix of selectable Quadrature Amplitude Modulation (QAM) constellations to yield constellation symbols of mixed-modulation data sub-carriers, wherein the data sub-carriers include Orthogonal Frequency Division Multiplexing (OFDM) sub-carriers;
- causing transmission of a Radio Frequency (RF) signal, the RF signal based on the constellation symbols, wherein the mix of selectable QAM constellations includes a pair of QAM constellations including 1024 QAM and 2048 QAM;
- interleaving the constellation symbols in time and frequency;
- after interleaving, transforming the constellation symbols from the interleaver into a time domain to generate time domain symbols; and
- prepending a cyclic prefix and performing a windowing operation on the time domain symbols.

16. The method of claim 15, further including block encoding the data bit streams to generate block encoded data bit streams, mapping including mapping the block encoded data bit streams to yield the mixed-modulation data sub-carriers.

17. The method of claim 16, wherein block encoding includes Low-Density Parity Check (LDPC) Forward Error Correction (FEC) coding.

18. The method of claim 17, wherein block encoding includes encoding data bit stream block lengths of 16,200 bits with an 8/9 code rate.

19. The method of claim 15, wherein the mix of selectable QAM constellations include non-square QAM constellations.

20. The method of claim 15, further including distributing the data bit streams into multiple segments, mapping data bit streams including mapping the segments onto the mix of selectable QAM constellations.

\* \* \* \* \*